Patented Dec. 26, 1939

2,184,888

UNITED STATES PATENT OFFICE 2,184,888

HALOGENATED MATERIAL AND METHOD OF PRODUCING SAME

Irving E. Muskat, Akron, and Albert G. Chenicek, Barberton, Ohio, assignors to Pittsburgh Plate Glass Company, Allegheny County, Pa., a corporation of Pennsylvania No Drawing. Application July 20, 1939, Serial No. 285,586

14 Claims. (Cl. 23—190)

This invention relates to halogenated nitrogen compounds of high stability and high active halogen content and to methods of producing such compounds. In prior applications Serial No. 179,956 filed December 15, 1937, and Serial No. 215,870 filed June 25, 1938, we have described certain chlorine derivatives of nitrogen compounds.

In accordance with the present invention, we have discovered other compounds of high halogen content which may be derived from nitrogen compounds. For example, amides or imides of cyanuric acid may be treated with chlorine, iodine, fluorine or bromine to form soluble, stable compositions containing active halogen, preferably in concentrations upwards of 40 percent. Of particular interest in this respect are the products which may be derived from the treatment of ammeline, ammelide or melamine or mixtures thereof. It is found that when these materials are halogenated, solid compositions which are stable over a period of many months and which may contain in excess of 150 percent active bromine or iodine are produced. In addition, cyanamide polymers or derivatives such as dicyandiamide, or mixtures of dicyandiamide and melamine may be treated in accordance with the present invention.

The exact chemical structure of the products so produced is unknown but it appears that they are mixtures containing the corresponding N-halo derivatives of the nitrogen compounds undergoing treatment wherein one or more hydrogen atoms are replaced by chlorine, iodine, fluorine and/or bromine. It should be understood, however, that we do not wish to be bound by a theoretical explanation of the chemical structure of the composition since the reaction is apparently somewhat complex. In general, the products are solid crystalline substances containing up to as high as 160 percent active bromine or 170–180 percent active iodine and vary in color from white to dark orange in accordance with the amount of bromine or iodine which they contain. These products are slightly soluble in water and more soluble in aqueous alkaline solutions and in triacetin, ethyl acetate, acetonyl acetone, carbon tetrachloride and other chlorinated solvents. In general, the products of high chlorine, bromine or iodine content are more soluble in organic solvents such as chloroform or carbon tetrachloride and less soluble in water than those which contain less of these halogens. When dissolved, they form solutions containing active halogens which are stable for a long period of time. Upon hydrolysis of a quantity of our halogenated compounds, ammeline, ammelide and/or melamine is produced.

In a similar manner, we have found that derivatives of dicyandiamide, ammeline, ammelide or melamine or other polymer of cyanamide or other amide or imide of cyanuric acid such as the sodium, potassium, calcium, barium, or other alkali or alkaline earth salts thereof, or organic or amino or cyano-organic derivatives thereof, such as N-methylated, N-ethylated, or other N-arylated or alkylated compounds of melamine, ammeline, dicyandiamide or ammelide, may be brominated or iodinated to form similar products containing active iodine or bromine.

If desired, these compounds may be halogenated in the pure state, but this is in no way necessary and very often it may be desirable to halogenate mixtures wherein melamine and/or dicyandiamide is an ingredient. For example, products of high stability and active halogen content may be obtained by treatment of cyanamide or its salts under conditions such that polymerization of the cyanamide occurs to form quantities of dicyandiamide and/or melamine. This polymerized mixture may then be chlorinated, brominated or iodinated with or without substantial separation of the dicyandiamide or melamine from the mixture. Similarly, mixtures containing ammeline, ammelide, and/or melamine as an ingredient may be treated. Since ammeline and ammelide are sometimes prepared together and are difficult to separate, mixtures of these materials may be treated.

The halogenation may be effected in a suitable manner as, for example, by halogenation in the dry state or by treatment of fluid dispersions of the materials. Such dispersions may be in the form of true solutions or colloidal solutions or suspensions of the materials to be treated. We have found that an effective treatment may be secured by passing chlorine or bromine through an aqueous slurry of the cyanuric acid amides or imides. In a similar manner, the products may be halogenated in other suitable inert solvents or suspension media such as carbon tetrachloride, chloroform, etc., or in the presence of a gaseous diluent such as air, carbon dioxide, nitrogen, etc. Similarly, the halogenation may be conducted by use of solutions of halogens. Iodine solutions are particularly suited for this process.

The time and rate of treatment of these compounds is capable of considerable variation and it is found that the amount of halogen in the final product may be controlled to some degree by controlling these factors. The reaction has been carried out at temperatures from 0° C. upward and it has been found that to some extent, an increase in temperature may permit an increase in the amount of chlorine, iodine or bromine absorbed by the composition. In general, treatment at room temperature gives satisfactory results.

Since the product is somewhat soluble in water, it will be apparent that the aqueous filtrate such as may be obtained after treatment of aqueous slurries, in accordance with our invention, may be substantially saturated with the halogenated material. This solution may, if desired, be recycled for use as the aqueous medium in which other portions of materials are to be halogenated or may be used as a disinfecting, bleaching or sterilizing liquor.

The following examples illustrate the invention.

*Example I.*—An aqueous slurry containing 100 grams per liter of melamine was prepared and liquid bromine was added dropwise with stirring until the color no longer was destroyed. The temperature was kept at 15–20° C. The solid product was separated by filtration and dried. Analysis showed it to contain 112% active bromine. The analysis of the compound corresponded roughly to the theoretical analysis in which hydrogen has been replaced by active bromine.

*Example II.*—A solution of 260 grams of iodine in 10% sodium hydroxide solution was added to slurry of 50 grams of melamine in one liter of water. The reaction was allowed to proceed for 4 hours at a temperature of 50–60° C. The solid product obtained by filtration contained 128% active iodine. The analysis of the compound corresponded roughly to the theoretical analysis which the compound would be expected to have considering the iodine to have replaced an equivalent amount of hydrogen.

*Example III.*—A solution of 960 grams of bromine in carbon tetrachloride was added over a period of 5 hours to a suspension of 126 grams of melamine and 320 grams of sodium carbonate in 500 cc. of carbon tetrachloride. The insoluble material was removed by filtration and the filtrate evaporated to dryness under reduced pressure to yield a yellow solid. By analysis this material contained 158% active bromine.

*Example IV.*—A slurry of 100 grams of ammeline-ammelide mixture in 500 cc. of water was treated with bromine until the color was no longer discharged. The product was separated by filtration, washed with water and dried. It contained 108% active bromine.

*Example V.*—An aqueous slurry containing 100 grams per liter of ammeline was prepared and a stream of chlorine bubbled into the slurry for two hours at a temperature of 8–10° C. at a rate of 0.7 gram per minute per liter of slurry. The slurry was then filtered and a white solid product containing 69 percent chlorine was thereby obtained. The solid product was found to be fairly soluble in water, aqueous alkaline solutions, triacetin, acetonyl acetone and ethyl acetate. By analysis, it contained 33.8% chlorine, 17.9% carbon, 29.9% nitrogen, 2.0% hydrogen, and 16.4% oxygen. This analysis corresponds roughly to the theoretical analysis of the dichloroammeline containing one mole of water of crystallization.

*Example VI.*—An aqueous slurry containing 97 grams per liter of melamine was prepared and a stream of chlorine was bubbled into the slurry at a rate of approximately 0.75 gram per minte per liter of slurry at a temperature of 0–10° C. for 4 hours. The slurry was filtered and a white solid product containing 73 percent active chlorine was obtained. By analysis, this product contained 42.4 percent chlorine, 33 percent nitrogen, 19 percent carbon and 2.6 percent hydrogen and 3 percent oxygen. The product was soluble in triacetin, acetonyl acetone, ethyl acetate, water and aqueous alkaline solutions.

*Example VII.*—An aqueous slurry containing 65 grams per liter of melamine and 60 grams per liter of calcium hyroxide was treated with a stream of chlorine at a temperature of 13–15° C. at a rate of 0.75 gram of chlorine per minute per liter of slurry for a period of 6 hours. The product produced was a yellow-orange colored solid containing 88.5% active chlorine and was soluble in the usual solvents. By analysis, it contained 43.7 percent chlorine, 30.6 percent nitrogen, 16.7 percent carbon, 1.4 percent hydrogen and 7.6 percent oxygen. Upon hydrolysis of this product, a substantial quantity of ammeline, ammelide and melamine was obtained.

*Example VIII.*—An aqueous slurry containing 65 grams per liter of ammeline and 60 grams per liter of calcium hydroxide was chlorinated in a manner similar to that described in Examples V and VII at a temperature of 10–15° C. for 7 hours. The product obtained was an orange colored solid containing 92 percent active chlorine and was soluble in water, acetonyl acetone, triacetin, ethyl acetate and in aqueous alkaline solutions. By analysis, it contained 45 percent chlorine, 25 percent nitrogen, 15 per cent carbon, 1.5 per cent hydrogen and 14.5 percent oxygen.

The products may be mixed with various materials having alkaline reactions such as alkali metal hydroxides, carbonates or alkaline earth hydroxides or carbonates. The solubility of the halogenated product appears to be increased in alkaline solutions, for example, in solutions containing sodium hydroxide, sodium bicarbonate, sodium phosphates, or sodium carbonate. Often it may be desirable to halogenate in the presence of these agents.

These alkaline materials may form corresponding hypobromites or hypoiodites during treatment and if desired, the compounds undergoing treatment may be chlorinated, brominated, iodinated in the presence of substantial quantities of these substances to yield compositions of high stability and sterilizing or bleaching properties containing both the product and a suitable halite. Mixtures containing halogenated amides or imides or cyanuric acid such as brominated or iodinated melamine or chlorinated ammeline or ammelide and hypochlorites appear to be more stable as to active bromine or iodine content than the corresponding hypoiodites or hypobromites alone.

Treatment in the presence of alkaline materials, suitable calcium hydroxide, sodium carbonate, etc., appears to promote the absorption of further quantities of halogen. In addition, it is sometimes advantageous to add certain other compositions such as phosphates or silicates to the composition, before, during, or after halogenation.

While we have described the halogenation of these compounds by use of bromine or iodine or other brominating or iodinating agents such as hypobromous acid, hypoiodous acid, or the salts thereof, may also be used.

These compounds prepared in accordance with our invention may be used as bleaching, sterilizing or disinfecting agents. Very desirable products of high sterilizing properties may be produced by mixing dispersions of these materials with detergent compositions, such as soaps, phosphated or sulphated alcohols such as the sulphates and phosphates of primary or secondary aliphatic alcohols, such as octyl, lauryl, oleyl, or hexyl alcohol; alkali metal phosphates such as trisodium phosphate or sodium hexametaphosphate, organic sulphonic acids or salts thereof, such as Turkey red oil, isopropyl naphthalene sodium sulphonate or toluene sulphonic acid, etc., alkali metal carbonates, silicates, etc. Other uses thereof will be obvious to those skilled in the art.

Although the present invention has been described in connection with the specific details of certain embodiments thereof, it is not intended that such details shall be considered as limitations upon the scope of the invention except insofar as included in the accompanying claims.

We claim:

1. A halogenated compound of the group consisting of halogenated amides and imides of cyanuric acid and polymers of cyanamide, said composition being characterized in that a substantial amount of the halogen in said halogenated composition is present as active halogen.

2. Brominated melamine characterized in that a substantial amount of the bromine in said brominated melamine is present as active bromine.

3. Iodinated melamine characterized in that a substantial amount of the iodine in said iodinated melamine is present as active iodine.

4. Brominated dicyandiamide characterized in that a substantial amount of the bromide in said brominated dicyandiamide is present as active bromine.

5. A brominated compound of the group consisting of the amides and imides of cyanuric acid and polymers of cyanamide, said brominated composition being characterized in that a substantial amount of the bromine in said brominated compound is present as active bromine.

6. An iodinated compound of the group consisting of the amides and imides of cyanuric acid and polymers of cyanamide, said iodinated composition being characterized in that a substantial amount of the iodine in said iodinated compound is present as active iodine.

7. A brominated amide of cyanuric acid characterized in that a substantial amount of the bromine in said brominated amide is present as active bromine.

8. An iodinated amide of cyanuric acid characterized in that a substantial amount of the iodine in said iodinated amide is present as active iodine.

9. The process of preparing a composition of high active halogen content which comprises treating a compound of the group consisting of the amides and imides of cyanuric acid and polymers of cyanamide with a halogenating agent.

10. The process of preparing a composition of high active halogen content which comprises treating an aqueous dispersion of a compound of the group consisting of the amides and imides of cyanuric acid and polymers of cyanamide with a halogenating agent.

11. The process of preparing a composition of high active halogen content which comprises treating a dispersion of a compound of the group consisting of the amides and imides of cyanuric acid and polymers of cyanamide in carbon tetrachloride with a halogenating agent.

12. The process of preparing a composition of high active halogen content which comprises treating a compound of the group consisting of the amides and imides of cyanuric acid and polymers of cyanamide with an iodinating agent.

13. The process of preparing a composition of high active halogen content which comprises treating a compound of the group consisting of the amides and imides of cyanuric acid and polymers of cyanamide with a brominating agent.

14. A halogenated amide of cyanuric acid characterized in that a substantial amount of the halogen in said halogenated amide is present as active halogen.

IRVING E. MUSKAT.
ALBERT G. CHENICEK.